United States Patent [19]
Lincoln et al.

[11] 3,913,681
[45] Oct. 21, 1975

[54] OUTRIGGED ROTATING CULTIVATOR

[75] Inventors: William D. Lincoln; William W. Lincoln, both of Napa, Calif.

[73] Assignee: Lincoln Farm Equipment Company, St. Helena, Calif.

[22] Filed: Apr. 17, 1974

[21] Appl. No.: 461,580

[52] U.S. Cl. .................... 172/5; 172/99; 172/112
[51] Int. Cl.² .................... A01B 63/00; A01B 33/00
[58] Field of Search .............. 172/111, 4, 5, 98, 99, 172/112, 110

[56] References Cited
UNITED STATES PATENTS

| | | | |
|---|---|---|---|
| 2,489,633 | 11/1949 | Fulgham | 172/5 |
| 2,552,710 | 5/1951 | Dodson | 172/112 X |
| 2,718,836 | 9/1955 | Pertics et al. | 172/99 |
| 2,749,824 | 6/1956 | Friday | 172/5 |
| 3,117,632 | 1/1964 | Caggiano, Jr. | 172/5 |
| 3,177,950 | 4/1965 | Laikam | 172/5 |

*Primary Examiner*—Stephen C. Pellegrino
*Attorney, Agent, or Firm*—Townsend and Townsend

[57] ABSTRACT

An outrigged rotating cultivator is attached to a tractor for cultivating an orchard or vineyard in the interstitial unplanted soil area between trees or vines planted in rows. The cultivator is mounted to a tractor by a three-point free-link pickup. A rigid arm extends outwardly from its mount on the three-point free-link pickup on the tractor approximately one half the distance to the rotating tiller. At the outboard end of the arm, a hinged parallel bar attachment is provided to connect a hydraulic motor-powered tiller to the rigid arm. The hinge at the rigid arm in combination with an obstacle sensor arm, a hydraulic piston and sensor arm connected hydraulic circuitry permits hinged movement of the tiller responsive to the sensor arm detected obstacles, such as plants in the tiller path. The parallel bar support maintains a controlably constant angle of attack of the tiller with respect to the ground. This angle of attack is maintained controlably constant by the three-point free-link pickup while simultaneously permitting free up and down vertical tiller movement responsive to changes in local ground elevation. A combination guard and sliding shoe is attached to the bottom of the guard and extends over the rotating tiller to maintain the tiller at a constant tilling elevation with respect to the earth. The sliding shoe permits sliding forward and transverse tilling movement as the tiller hingeably pivots towards and away from the tractor around plant to cultivate interstitial area trees or vines planted in rows.

4 Claims, 6 Drawing Figures

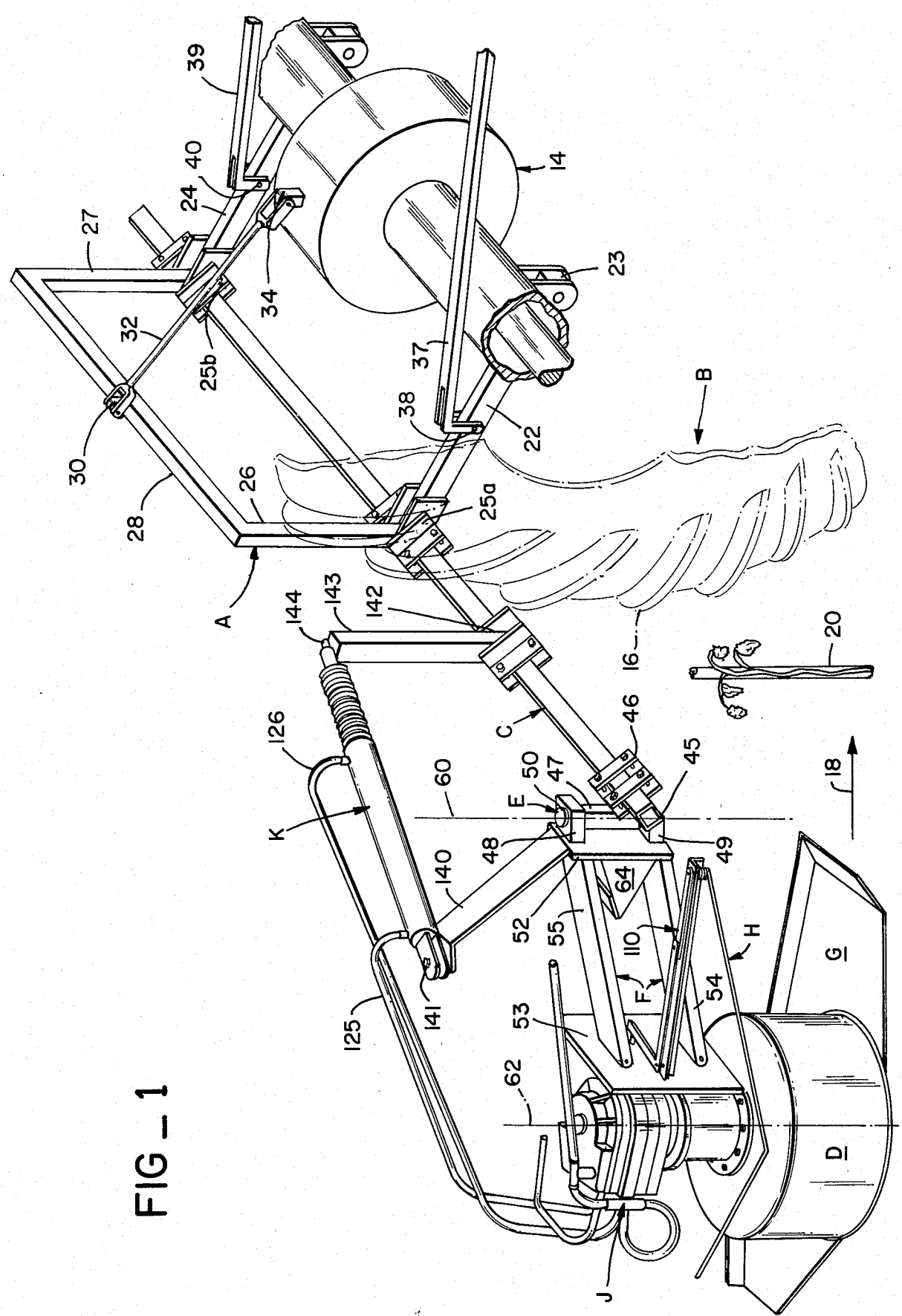
FIG._1

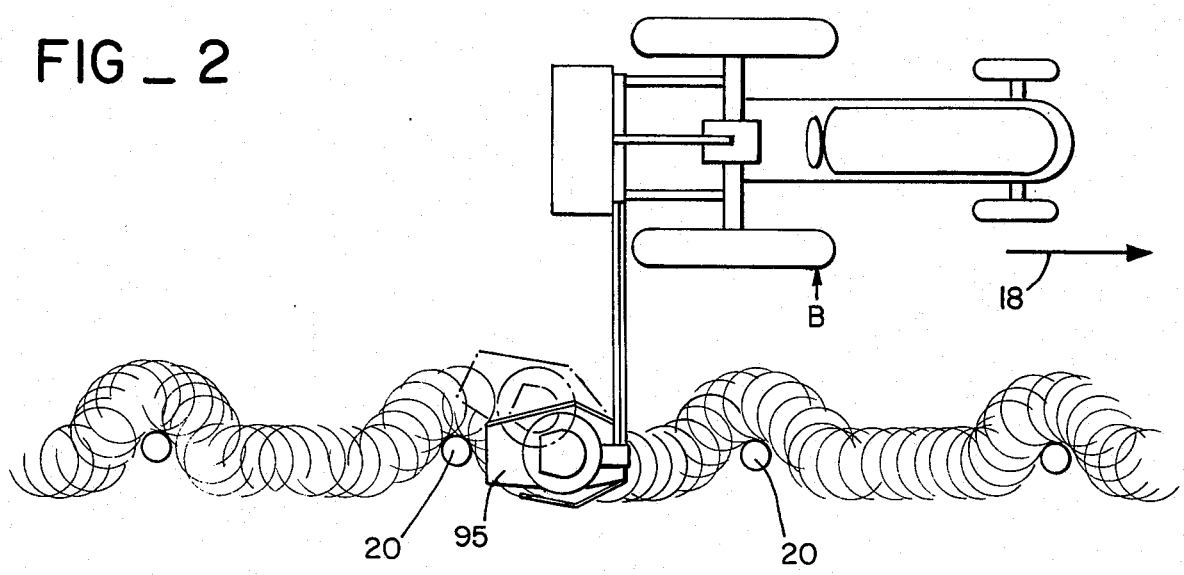
FIG_2
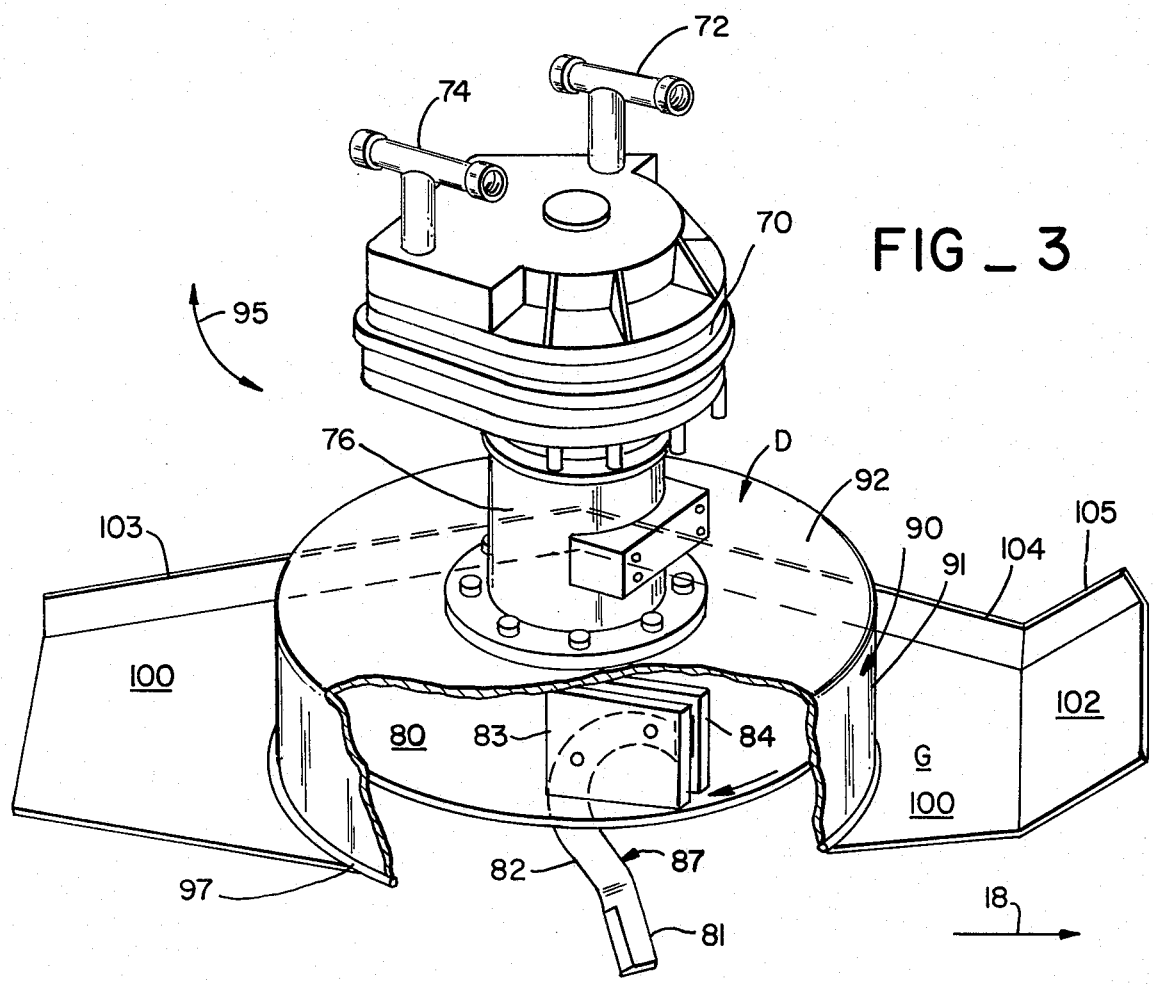
FIG_3

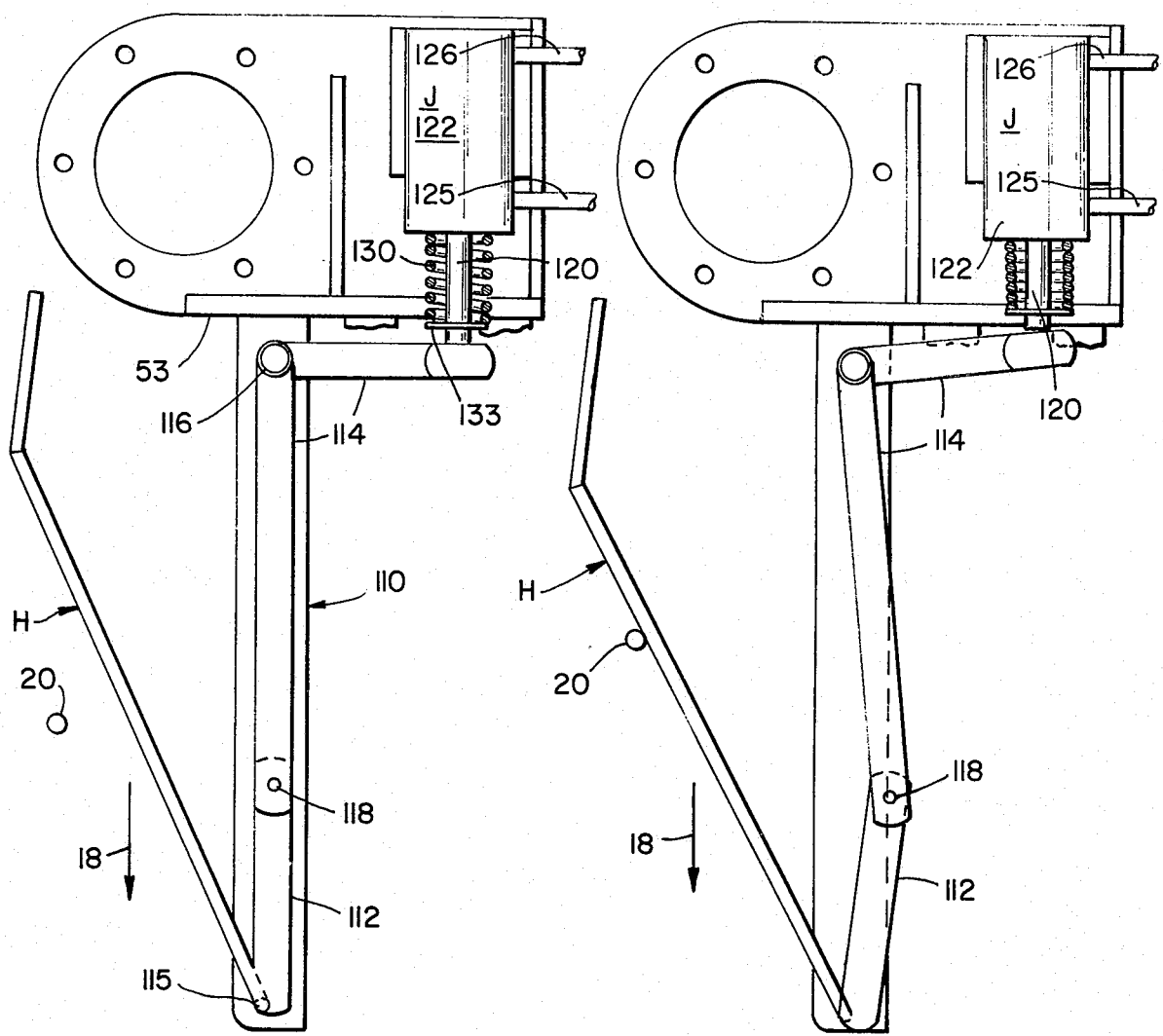
FIG _ 5    FIG _ 6
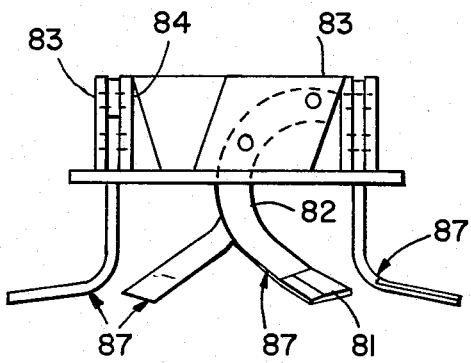
FIG _ 4

OUTRIGGED ROTATING CULTIVATOR

This invention relates to tillers. More particularly, this invention relates to an automated pivotally controlled tiller designed to till the interstitial unplanted areas in vineyards or orchards between vines or trees planted in rows.

SUMMARY OF THE PRIOR ART

The tilling of interstitial areas between vines or trees in vineyards or orchards has always presented a problem. Typically, such plants are arranged in rows to permit plowing in one direction only. When conventional plowing occurs along such rows, it cannot penetrate into the unplanted soil area interstitially of the plants.

To avoid hand tilling of the interstitial unplanted soil area between trees or vines, pivotally retractable tillers mounted to or pulled by tractors have been developed. Typically, a tractor passes down open field between adjacent rows of plants. The outboard mounted automated tiller pivots into and out of the soil stip occupied by a row of plants. It pivots into the soil area occupied by the row of plants in the interstitial unplanted soil area between plants within the plant row. It pivots out of the soil occupied by the row of plants when a specific plant is encountered.

Prior art retractable tillers have included a number of serious disadvantages. Primarily, the tiller is pivoted about a pivot point which is immediately adjacent the tractor or carriage upon which the tiller is carried. Typically, the tiller must pivot about an inordinately long arm. The result is slow tiller movement with resultant inability of the rotating tiller to follow and till close to and immediately around an encountered plant. Moreover, prior art controls for tiller hinged movement have been both powered and controlled between the hinge and the tractor. This powering and control of the hinged movement of the tiller between the hinge and the tractor results in a slow following movement of the tiller with resultant reduced tiller speed and an inability to closely till the contour around encountered plants. Examples of such tillers are included in Fulgham U.S. Pat. No. 2,489,633; Pertics et al. U.S. Pat. Nos. 2,718,836 and 2,694,355; and Friday U.S. Pat. No. 2,749,824.

Moreover, such tillers are incapable of accommodating efficiently local elevation changes commonly encountered in orchards and vineyards. Some outrigged tillers are rigidly connected to and powered by mechanical linkages from the tractor. Upon the encounter of a local elevation change, shock impact and upward thrust are transmitted to the tractor with resultant uneven tilling and possible mechanical damage to the tiller, power linkage or tractor. Alternately, the tillers are momentarily lifted free of the earth by local change in ground elevation to prevent tilling in the entirety.

Some attempts to control this tendency of tillers have been provided by affixing to the tractor manual controls for raising and lowering the tiller. These controls for raising and lowering the tiller require driver attention with resultant driver inattention to the direction of tractor travel as well as the hinged movement of the rotating tiller into and out of the interstitial area between plants.

Further, in all prior art devices raising and lowering of the tiller has required correspondent change in the rotational axis of the tiller with respect to horizontal. Change of the rotational axis of the tiller with respect to horizontal changes the angle of attack of the tiller with respect to the ground. Uneven tilling of the ground results. Examples of such tillers are shown in Mallory U.S. Pat. No. 3,190,364 and Caggiano U.S. Pat. No. 3,117,632.

Moreover, all prior art rotating tillers, because of their constantly changing angle of tiller attack to the ground, have used exposed rapidly rotating tillers. These tillers, typically semispherical in lower contour and rapidly rotating, tend to strike obstacles such as rocks and sticks in a vineyard or orchard. When such rocks or sticks are impacted by a rotating tiller, these rocks or sticks are hurled away from the tiller at unpredictable velocities and trajectories in such a manner that they are extremely unsafe.

SUMMARY OF THE INVENTION

An outrigged rotating cultivator is attached to a tractor for cultivating an orchard or vineyard in the interstitial unplanted soil area between trees or vines planted in rows. The cultivator is mounted to a tractor by a three-point free-link pickup. A rigid arm extends outwardly from its mount on the three-point free-link pickup on the tractor approximately one half the distance to the rotating tiller. At the outboard end of the arm, a hinged parallel bar attachment is provided to connect a hydraulic motor-powered tiller to the rigid arm. The hinge at the rigid arm in combination with an obstacle sensor arm, a hydraulic piston, and sensor arm connected hydraulic circuitry permits hinged movement of the tiller responsive to sensor arm detected obstacles, such as plants in the tiller path. The parallel bar support maintains a controlably constant angle of attack of the tiller with respect to the ground. This angle of attack is maintained controlably constant by the three-point free-link pickup while simultaneously permitting free up and down vertical tiller movement responsive to changes in local ground elevation. A combination guard and sliding shoe attached to the bottom of the guard extend over the rotating tiller to maintain the tiller at a constant tilling elevation with respect to the earth. The sliding shoe permits sliding forward and transverse tilling movement as the tiller hingeably pivots towards and away from the tractor around plant to cultivate interstitial area between trees or vines planted in rows.

FURTHER OBJECTS AND ADVANTAGES OF THE INVENTION

An object of this invention is to provide for improved hinged retractable rotation of a tiller. According to this aspect, a rigid arm extends approximately half the distance between the full outboard extension of the tiller on one hand, and the supporting tractor or vehicle on the other hand. A rigid sensor arm is provided to lead the tiller and is connected to hydraulic controls on the tiller itself. An hydraulic piston, connected at one end by linkage to the tiller and connected at the other end to the rigid arm, is provided to move the tiller about its hinge to pivot towards and away from the tractor upon detection of an obstacle.

An advantage of the tiller retraction herein disclosed is that rapid movement of the tiller on an arm of relatively short radius is provided for following closely ground plant contour.

A further advantage of the automated retractable tiller is the driver can devote his full attention to driving; turning or moving the tractor to maneuver the outboard rotating tiller around obstacles is not required.

A further object of this invention is to provide an outboard tiller with an independent power source such as a hydraulic or electric motor which is independent of direct mechanical linkage to the tractor.

An advantage of an independent power source is that the transmission of power between the tractor and tiller does not have to conform to changing tiller elevation, changing tiller angle of attack with respect to the ground, and hinged tiller movement towards and away from the tractor. Moreover, shock transmitted to the tiller (as when it strikes an obstacle or local change in ground or elevation) is not transmitted to direct linkage power transmissions connected the tractor and rotating tiller.

A further object of this invention is to disclose a tiller with a guard extending completely over its rapidly rotating tilling implements.

An advantage of the guard extending over the rapidly rotating tilling implements is that when the implements encounter rocks, sticks and the like in an orchard or vineyard, they are merely thrown against the guard and not impelled at unpredictable angles and velocities where machinery, personnel or plants can be endangered.

Another object of this invention is to disclose a shoe which maintans the rapidly rotating tiller implements at a constant elevation with respect to the immediately adjacent ground. According to this aspect, the shoe slides over the ground and is preferably mounted to the lower surface of the tiller guard so as to support the rapidly rotating tiller at a constant elevation with respect to the ground.

An advantage of this tiller shoe is that elevational adjustment can be provided to the tiller by merely resting it on the ground. Operator attention to the raising and lowering of the tiller responsive to either changed elevation at the tiller or altered tractor angle as it moves through the orchard is not required.

A further object of this invention is to disclose a parallel bar support mechanism extending between the hinge on the rigid arm and the tiller. According to this aspect of the invention, hinged parallel bars are connected between the outboard end of the rigid arm and the tiller. The tiller is free to move upwardly and downwardly on the parallel bars. Such upward and downward movement occurs without a change in the tiller angle of attack.

An advantage of this aspect of the invention is that even though the tiller elevation with respect to the tractor changes, its angle of attack to the soil with respect to the tractor remains unchanged. Tilling is uniform while tiller elevation varies freely.

A further advantage of the parallel bar linkage is that the attack of the tiller with respect to the ground can be varied irrespective of the elevation of the tiller with respect to the tractor. This can be done by attaching the tiller of this invention to a conventional free-link three-point pickup on the tractor.

A further advantage of the parallel bar support is that the tiller downward force on the ground is constant. The tiller, of its own weight, can ride on its shoe and bear on the ground with a constant force. Change of tiller weight produces correspondent change of tiller downward force on the ground.

Other objects, features and advantages of this invention will become more apparent after referring to the following specification and attached drawings in which:

FIG. 1 is a perspective view of the tiller of this invention shown connected to a conventional free-link three-point pickup mounted to the differential of tractor and extending outwardly on a rigid arm to the right of the tractor (the tractor being shown broken away for ease of understanding of the tiller mount);

FIG. 2 is an overhead view of plan of the tiller driving alongside a row of plants in a vineyard with the outrigged tiller shown extended fuly outward in solid lines, and retracted fully inward in broken lines;

FIG. 3 is an expanded view of the tiller only, taken at the guard and sliding shoe, with the guard and sliding shoe broken away to illustrate the tiller implements contained interiorly of the tiller in their tilling relationship with the ground;

FIG. 4 is a detail of the tiller rotating disc showing attachment of the tiller implements to the disc of the rotating tiller;

FIG. 5 is a detail of the tiller and sensor arm immediately before contact with an obstructing vineyard or orchard plant; and FIG. 6 is a view similar to FIG. 5 showing the sensor arm immediately after contact with an obstructing vineyard or orchard plant.

Referring to FIGS. 1–3, a three point free-link pickup A is shown mounted conventionally to a tractor B in the vicinity of differential 14. An outrigger arm C extends approximately half the distance between outboard tractor tire 16 and rotating tiller D.

Tiller D is connected to the outboard end of arm C by hinge E and parallel linkage F. Tiller D rides over the ground on a shoe G forwardly and in the direction of tractor forward movement indicated by arrow 18. During such forward motion, sensor arm H encounters objects such as plant 20, and through connected hydraulic circuitry J (obscured in FIGS. 1 and 3) activates double acting hydraulic cylinder K to move tiller D about hinge E towards and away from tractor B as schematically illustrated in FIG. 2.

Three-point free-link pickup A is typical of attachments for hitching implements to agricultural tractors. Such attachments are more particularly described in the 1972 Agricultural Engineers Yearbook at pages 267–268, pursuant to ASAE Standard: ASAE S217.8 entitled *Three-Point Free-Link Attachment Rigging Implements to Agricultural Wheel Tractors*. A right lower link 22 attaches to a lower link point 23, and left lower link 24 attaches to an identical link point. Right lower link 22 connects at arm C at lower hitch point 25a; similarly, left lower link 24 connects at arm C at lower hitch point 25b. The distances between links 22 and 24 referred to as the hitch point spread, are spanned by the inner portion of arm C. A mast structure including paired vertical mast bars 26, 27 with a horizontal mast bar 28 and an attached upper hitch point 30 is shown. An upper link 32 extends between an upper link point 34, and uper upper point 30. All links, link points, and hitch points are rotatable along axes parallel to the longitudinal axis of arm C.

Raising the lowering of the three-point free-link attachment A is effected through draw bars 37, 39 which attach to pins 38 and 40 through paired lower links 22, 24. The rotating three-point free-link pickup movement of the tiller D with respect to tractor B as described in the above-referenced ASAE Standard is provided.

A is knwon to those skilled in the art, raising and lowering of the three-point free-link attachment A has two effects. First, the elevation of attached outrigger arm C is changed with respect to the tractor B. Second, a slight variation in the angle of arm C with respect to the ground upon which the tractor rests occurs. As will hereinafter be more fully set forth, this change in angle can produce a change in the angle of attack of tiller D as it attaches to the end of the outrigged arm C at hinge E.

At the outermost end 45 of arm C, clamp 46 attaches a hinge E. Broadly, a first hinge member 47 is attached to clamp 46. Second hinge members 48, 49 are affixed to parallel linkage F. All of these hinge members 47, 48 and 49 are transpierced with a hinge pin bore (not visible) and hinged together by a solid hinge pin 50.

Parallel linkage F includes a hinge mounting plate 52, a tiller mounting plate 53, and parallel linkage bars 54, 55 extending therebetween. Parallel linkage bars 54 and 55 are hinged to hinge plate 52 at their upper end, hinged to tiller mounting plate 53 at their lower and outer end, and are approximately of the same dimension. As hinged to the respective plates 52, 53; parallel linkage bars 54, 55 rotate about horizontal axes with respect to the ground.

Stopping at this juncture and omitting for purposes of the present discussion the action of hinge pin E, the vertical up and down movement of the tiller D with respect to the hinge E can be understood. It will be seen that hinge pin E is disposed along an axis 60 so that the tiller D rotates about axis 60. Likewise, it will be understood that tiller D rotates about an axis 62. It will be understood that up and down movement of tiller D with respect to hinge E will maintain axis 62 in parallel alignment with axis 60. Thus, tiller D will maintain an axis of rotation 62 which is the same as axis 60 of hinge E.

It is desirable not to allow parallel linkages 54, 55 to depend to a near vertical position with respect to hinge plate 52. Moreover, it is preferred to raise and lower tiller D by correspondent raising and lowering of the three-point free-link pickup A. To this end, wedge shaped stop 64 is placed underlying parallel link 55. As should be apparent, upon raising of the three-point free-link pickup A beyond a preselected level, the bottom portion of link 55 comes into contact with the upper portion of stop 64. When this occurs, downward movement of links 54, 55 relative to hinge E will stop. The result will be that as outrigger C is raised beyond the point where stop 64 contacts link 55, tiller D will also be raised. Disengagement of the tiller D from tilling relationship with the earth will result.

Referring to FIGS. 3 and 4, tiller D and shoe G can be described and understood. Tiller D is driven by an hydraulic motor 70. Motor 70 is powered through paired hydraulic conduits, including power conduit 72 and discharge conduit 74. It can be emphasized that the powering of motor 70 through flexible conduit is highly advantageous. No direct mechanical transmission connection to the tractor is required. Thus, shock transmitted to the tiller and motor is essentially isolated at the tiller and motor; shock at the tiller is not transmitted to any tractor-tiller power transmission.

Hydraulic motor 70 connects to tiller D through bearing housing 76. The rotating shaft of motor 70 (not shown) is connected through bearings (not shown) in bearing housing 76 to rotate tiller disk 80.

Tiller disk 80 is typically constructed to have a plurality of tiller implements 87 depending downwardly from the lower surface of disk 80. Four such tiller implements are here shown.

Tiller implements 87 include a blade 81 and arcuate arm 82 which extend between blade 81 at the bottom and blade clamps 83, 84 on the upper surface of rotating disk 80. Typically, clamps 83, 84 are transpierced through arcuate arms 82 so as to fasten arcuate arms 82 of tilling implement 87 to the disk between clamps 83, 84.

It has been pointed out that tiller assembly D moves forwardly with tractor B in the direction of arrow 18. It has been found preferable to rotate disk 80 clockwise as viewed from above as shown in FIG. 3.

Bearing housing 76 has connected thereto a tiller casing 90. Tiller casing 90 is cylindrical in shape, having depending cylindrical side walls 91, and is closed at the top by disk-shaped member 92. Tiller casing 90 prevents tiller implements 87 from impelling objects at high velocities away from the tiller D where injury to plants or personnel can occur. Additionally, cover D serves as rigid and level point of attachment of shoe G.

It will be remembered that tiller D has two movements over the ground on which it rides. The first movement is forwardly and with the direction of tractor B movement as indicated by arrow 18. The second movement of tiller D is the transverse arcuate movement towards and away from tractor B. This movement occurs in the direction of arcuate arrow 95 as the tiller pivots about hinge E (See FIGS. 1, 2 and 3). It should be further understood that the closest point of approach of the tiller D to the stems or trunks of plants will occur along guard 90 in the vicinity of arrow 97.

Understanding this much, the construction of shoe G can now be set forth. Broadly, shoe G includes a flat plate 100 attached to the bottom of cover 90. Plate 100 is apertured so that tiller implements 87 protrude downwardly and below the shoe G at plate 100 to come into tilling contact with the earth. At its leading edge, plate 100 has a rider plate 102. Rider plate 102 protrudes upwardly at an angle of approximately 60° from the horizontal surface of plate 100. As tiller D is moved in tilling relation over the ground, plate 102 enables shoe G to ride upwardly and over the ground.

On the sides disposed to the tractor, shoe G is provided with upwardly tapered lips 103, 104 attached to plate 100, and upwardly tapered lip 105 attached to plate 102. These lips enable rapid sideways movement of tiller D towards tractor B without having the shoe dig into the earth. Usually, these lips are tapered at an angle of approximately 40° with respect to their adjacent plates 100, 102.

It should be understood that the depth of the tilling implements 87 below rotating disk 80, relative to the elevation of shoe G, establishes a constant and essentially unchanging penetration of the tilling implements. Thus, as tiller D slides over the ground on shoe G, constant depth tilling occurs.

Referring to FIGS. 1, 5 and 6, the construction of the mechanism which enables improved pivotal motion of the tiller about hing E, together with the improved sensor arm H and connected hydraulic circuitry J, can be understood.

Referring specifically to FIGS. 1 and 5, arm H is illustrated protruding from a bracket support 110. Bracket support 110 holds arm H at its outboard end, attaches to tiller mounting plate 53 at its inboard end, and is operatively connected to control valve assembly J by means of sensor arm link 112 and L-shaped crank 114.

Sensor arm link 112 is attached in fixed angular relation to sensor arm H, and is provided with a pivot point 115 at the outboard end of sensor arm support 110. L-Shaped crank 114 is provided with a pivot 116 at the inboard end of support 110, and is pinned to link 112 at its end remote from tiller mounting plate 53 at pin 118.

Control valve J is conventional. It includes a valve plunger 120, and a valve housing 122. Upon inward movement of plunger 120, fluid pressure is supplied to flexible conduit 126. Pressure to flexible conduit 126 contracts double acting hydraulic piston K to pivot tiller D inwardly and towards tractor B. Such a position of plunger 120 relative to valve housing 122 is illustrated in FIG. 6.

Conversely, outward movement of plunger 120 relative to casing 122 applies fluid pressure to flexible conduit 125. This supplies pressure to expand double acting cylinder K with the result that tiller D pivots outwardly and away from tractor B.

It is desired to bias control valve J so that the normal operating position of tiller D is pivoted outwardly and away from tractor B. Accordingly, compression coil spring 130 is mounted about plunger 120 between valve casing 122 and washer 133, pinned to plunger 120.

The construction and attachment of double acting cylinder K to rotate tiller D towards and away from tractor B can be easily understood. Typically, piston angle bar 140 is attached to the upper end of hinge plate 52 and extends upwardly therefrom to provide attachement of one end of double acting cylinder K at pin 141. Similarly, rigid arm C between bracket 46 and three-point free-link attachment A includes a bracket 142 having an upward extending vertical arm 143 terminating in a pin 144. Pin 144 attaches the other end of the double acting hydraulic cylinder K. It can easily be understood that expansion of cylinder K will rotate tiller D away from tractor B. Conversely, contraction of cylinder K will rotate tiller D towards tractor B.

Having set forth the operational mechanics of the tiller rotating mechanism, the operation of the tiller pivot can be understood with reference to FIGS. 2, 5 and 6.

Referring to FIG. 5, the position of the sensor arm H, link 112 and crank 114 is shown immediately before the impact of the sensor arm H with a plant trunk or stem 20. It will be remembered that control valve J will provide hydraulic pressure to flexible conduit 125 bias tiller J outwardly and away from tractor B.

Referring to FIG. 6 and upon impact of sensor arm H with a plant stem or trunk 20, link 112 and crank 114 will respectively pivot due to the action of their common pin 118. Valve stem 120 will be depressed by crank 114 to remove fluid pressue from flexible conduit 25 and to supply fluid pressure to flexible conduit 126. Conduit 126 will contract double acting piston K and rapidly move tiller D inwardly and towards tractor B. When contact of sensor arm H with plant trunk or stem 20 ceases, inward rotation of tiller D ceases. Outward rotaion of tiller D will commence. This outward rotation will continue to the full limit of outward tiller movements.

Referring to FIG. 2, the path which the tiller will follow should be apparent. Typically, the driver of the tractor B drives the tractor in the direction of arrow 18. When sensor arm H strikes a plant 20, rapid pivotal movement of tiller D on shoe G away from stem or trunk 20 will occur.

Once sensor arm H no longer contacts a stem or trunk, valve assembly J, crank 114 and link 112 will return to the disposition of FIG. 5. Fluid pressure will be supplied to conduit 125, expand double acting cylinder K, and tiller D will return to its full outboard position. The result will be an inward and outward movement of the tiller to till the ground schematically illustrated by the superimposed circles shown in FIG. 2. Thus, passage of the tiller in the row of plants will enable the interstitial area in between respective plants 20 to be remotely and rapidly tilled for optimum irrigation.

It should be apparent that this invention will admit of a number of modifications. For example, hydraulic powering of both the tiller and tiller hinge movement is not absolutely required, although it is clearly preferred. Electrical power and movement could substituted. Likewise, parallel linkage F herein disclosed is only one mechanical linkage arrangement which maintains parallelism between the hinge E along the axis 60, and the axis of the tiller D. Others can be used. Likewise, other modifications can be used within the spirit of this invention.

We claim:

1. An outrigged tiller for pivotal mount to a tractor between a distant location from said tractor and an adjacent location to said tractor comprising: a rigid arm mounted to said tractor at one end extending substantially horizontally at approximately right angles to said tractor direction of forward movement at least one half the distance between the side of said tractor and the distant location of said tiller from said tractor; a rotating tiller having depending tilling implements for passing over and through the ground in tilling relation; means coupled to said tiller for rotating said tilling implements; at least one link extending between said tiller and the outboard end of said arm for moving said tiller with said arm in the direction of forward movement of said tractor and permitting upward and downward movement of said tiller with respect to said tractor; a hinge connecting said link to said outboard end of said arm, said hinge having a substantially vertical axis of rotation at substantially right angles to said arm and having pivotal limits of movement to move said tiller between said distant location from said tractor and said adjacent location to said tractor; a second link pivotally mounted to said tiller and pivotally connected to said hinge for maintaining said tiller in a controllably constant relationship with the ground during upward and downward movement of said tiller; means for moving said rotating tiller about said hinge coupling one of said links to said rigid arm; and, sensing means mounted to said tiller for detecting obstacles in the path of said rotating tiller operably connected to said moving means to swing said tiller on said hinge from said distant location from said tractor to said adjacent location to said tractor.

2. An outrigged tiller for pivotal mount to tractor comprising: a rigid arm mounted to said tractor at one end and extending substantially horizontally at approximate right angles to said tractor direction of forward movement, a rotating tiller having dependent tilling implements with a constant angular relation with respect to the ground; means coupled to said tiller for rotating said tilling implements; a hinge connected to said arm, said hinge having a hinge axis substantially vertical and having limits of movement between a first angular disposition with respect to said arm wherein said tiller is disposed outwardly and away from said tractor and a second angular disposition with respect to said arm wherein said tiller is disposed adjacent said tractor on said arm; means for attaching said tiller to said hinge including at least a first movable member to permit said tiller to move upwardly and downwardly with respect to said rigid arm in following relation to said tractor as said tractor moves, said first movable member being coupled to said tiller; and, means coupled between said tiller and said hinge for maintaining said tiller in said constant angular relation with respect to said ground.

3. The invention of claim 2 and wherein said second means for maintaining said tiller in said constant angular relationship with the ground and includes a link pivotally mounted to said hinge at one end and pivotally mounted to said tiller at the other end.

4. The invention of claim 3 and wherein said first means for attaching said tiller to said hinge includes a link pivotally mounted to said hinge at one end and pivotally mounted to said tiller at said opposite end.

* * * * *